United States Patent [19]

Posch et al.

[11] 4,422,840

[45] Dec. 27, 1983

[54] VENTING DEVICE FOR A CLOSED MOLD

[75] Inventors: Gerhard Posch, Unterhaching; Rolf Nefzger, Munich, both of Fed. Rep. of Germany

[73] Assignee: Agfa-Gevaert AG, Leverkusen, Fed. Rep. of Germany

[21] Appl. No.: 202,060

[22] Filed: Oct. 30, 1980

[30] Foreign Application Priority Data

Nov. 30, 1979 [DE] Fed. Rep. of Germany ....... 2948318

[51] Int. Cl.³ ........................... B29C 1/00; B29F 1/00
[52] U.S. Cl. .................................... 425/472; 425/812
[58] Field of Search ............... 425/472, 542, 546, 547, 425/812

[56] References Cited

U.S. PATENT DOCUMENTS

| 4,091,069 | 5/1978 | Allen | 425/812 |
| 4,139,177 | 2/1979 | Hanning | 425/812 |
| 4,208,177 | 6/1980 | Allen | 425/812 |
| 4,212,623 | 7/1980 | Allen | 425/812 |

Primary Examiner—Willard E. Hoag
Attorney, Agent, or Firm—Michael J. Striker

[57] ABSTRACT

A ventilating device for a shaping tool having a shaping cavity, has a gas permeable member communicating with the cavity, a supporting member arranged to support the gas permeable member and having a plurality of ventilating openings which communicate with the cavity through the gas permeable member, on the one hand, and with a suction chamber through which a flushing liquid passes, on the other hand.

21 Claims, 3 Drawing Figures

VENTING DEVICE FOR A CLOSED MOLD

BACKGROUND OF THE INVENTION

The present invention relates to a ventilating arrangement for a shaping tool in which a plurality of sintered metal lamellas are inserted into a tool wall which bounds a shaping nest of the tool.

Ventilating arrangements of the above-mentioned general type are known in the art. In tools for injection molding or die casting, when plastic particles fill the shaping nest, the air which is displaced by the molten plastic entering the tool must be withdrawn from the tool in extremely short time. In the event if it has an opportunity to be condensed and heated to a certain degree during the filling process, the molding can suffer from discoloration and burning. Moreover, at locations where air pockets are formed in the tool, the molding obtains a pitted or rough outer surface or completely reproduces imperfect contours of the shaping nest. Further, the tool itself may suffer from premature wear.

Attempts have been made to avoid the above-mentioned effect which is detrimental to the injection molding process or the die casting process and is identified in the special literature as so-called Diesel effect. These attempts include roughening of the separation plate of the molds or provision of grooves so that the surfaces forming the separation plane are no longer gas-tight. In the cases when the shaping nest is located outside of the separation plane of the mold, it was known to insert a sintered lamellas in the wall of the shaping tool at the most dangerous locations, for example at the deepest point of a dome-shaped or hood-shaped shaping nest.

The above-described construction involves relatively great labor expenses. In addition to this, the sintered lamellas which are inserted into the mold and must be relatively small because of the strength requirements, are unable to evacuate the air entering the shaping nest during sufficiently short time.

SUMMARY OF THE INVENTION

Accordingly, it is an object of the present invention to provide a ventilating arrangement for a shaping tool, which has a simple construction and insures the evacuation of a great amount of gas in short time.

In keeping with these objects and with others which will become apparent hereinafter, one feature of the present invention resides, briefly stated, in an arrangement provided with a gas permeable member (sintered lamellas) wherein a supporting member is arranged to support the gas permeable member and has a plurality of ventilating openings which communicate with the nest of the shaping tool through the gas permeable member, on the one hand, and also communicate with a suction chamber through which a flushing liquid passes, on the other hand.

When the arrangement is designed in accordance with the present invention, it has a simple construction and effectively performs its intended functions in that it can withdraw a great amount of gas in very short time.

In accordance with another advantageous feature of the present invention, the suction chamber is connected with supplying and withdrawing elements for the flushing liquid.

In accordance with a further feature of the present invention, the suction chamber is connected with a riser pipe of a supply container, on the one hand, and with a suction pipe of a suction pump, on the other hand. In such a construction, the suction chamber always has a negative pressure which carries out fast absorption of the gas passing through the sintered lamellas by the flushing liquid.

In accordance with still a further feature of the present invention, a supporting member is formed as a holder insertable into the wall of the shaping tool and provided with openings communicating with the riser pipe and the suction pipe, respectively. Such a construction can be easily inserted into the tool and it is easy to service.

Yet another feature of the present invention resides in that the suction chamber is bounded by a cylindrical longitudinal portion of the supporting member which extends into the wall of the shaping tool. The supporting member also has a transverse wall in which the ventilating openings communicating with the sintered lamellas are provided. Advantageously a supply conduit and a withdraw conduit for the flushing liquid are concentrically mounted on the shaping member.

In accordance with an additional feature of the present invention, the supporting member which supports the sintered lamellas is provided with a thread for screwing the supporting member into the wall of the shaping tool.

Still an additional feature of the present invention resides in that the supporting member is mounted in the wall of the tool with the aid of the sleeve-shaped pressing member which can be formed as a setting cylinder. The setting cylinder may abut against an outer shoulder formed on the supporting member. This construction is especially suitable for the utilization of the arrangement in condition of small available spaces and for ventilation of the shaping nests which are arranged on the inner wall of the shaping tool.

When the supporting member is inserted into the inner wall of the tool, the sleeve shaped pressing member can abut against a part of the tool which lies on the wall outwardly surrounding the shaping nest. For a supporting member which is to be utilized at arbitrary location, it is advantageous when the pressing sleeve is held in its working position with the aid of a thread.

Finally, the supporting member can be provided with a thread for engaging with a pulling tool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
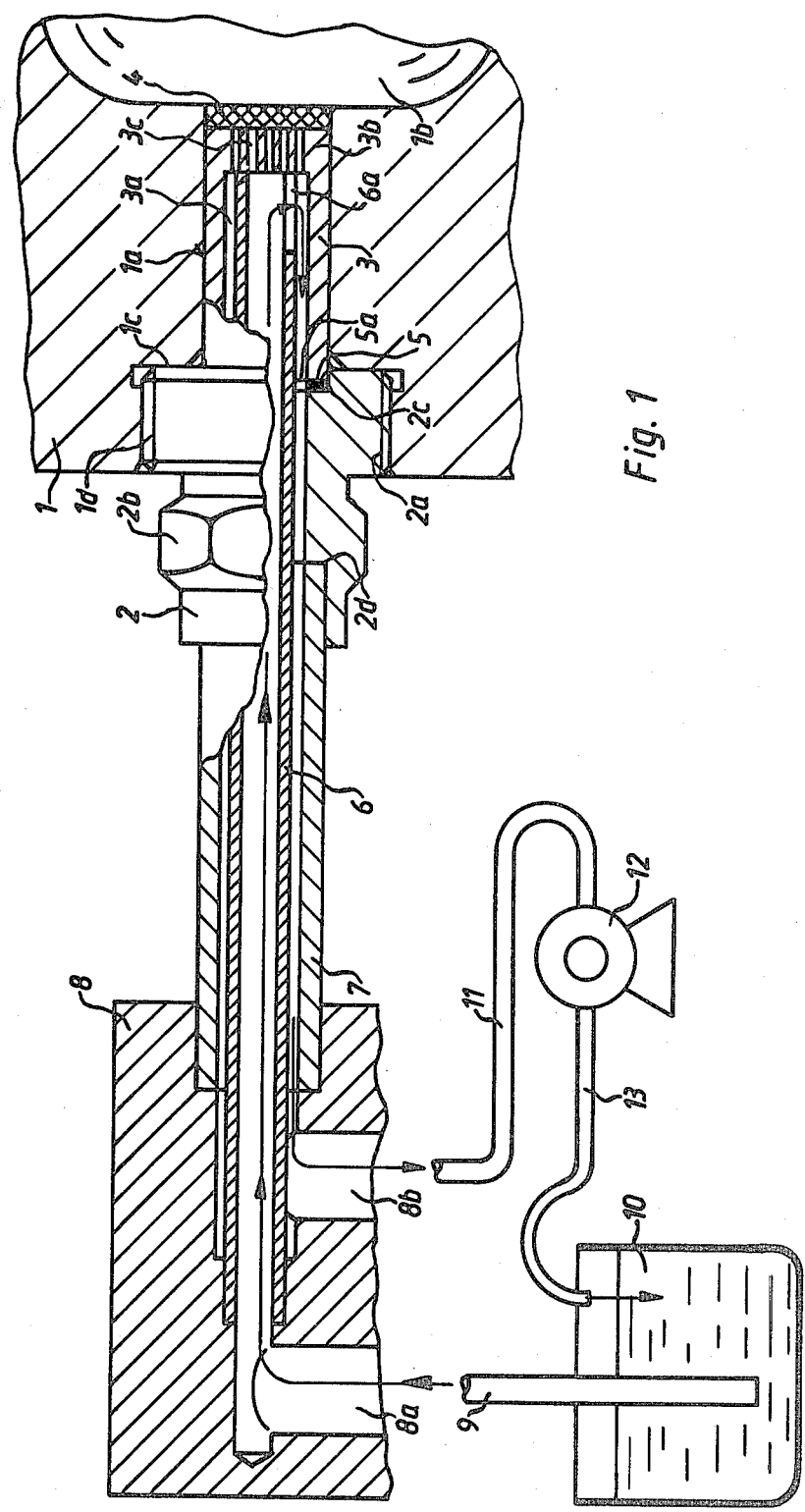
FIG. 1 is a view showing a section of a ventilating arrangement in accordance with the present invention.

FIG. 1 shows a shaping tool which has an outer wall 1 provided with an opening 1a. The opening 1a connects a shaping nest 1b of the tool with the outside air. The opening 1a is connected with an opening 1d which has a greater diameter than the opening 1a and is provided with a thread. A shoulder 1c is formed between the openings 1a and 1d.

A holding member 2 provided with a thread 2a is screwed into the thread 1d until it abuts against the shoulder 1c. The holding member 2 is provided with a hexagonal part 2b for fitting of a wrench thereon.

The holding member 2 has a side facing towards the shaping nest 1b and is connected at this side with a cylindrical supporting member 3, for example by soldering. The supporting member 3 encloses a cylindrical suction chamber 3a. The supporting member 3 has also a transverse wall 3b which bounds the suction chamber 3a at its end side and is provided with ventilating openings 3c. The ventilating openings 3c are closed by a plurality of sintered lamellas 4 which are soldered to the cylindrical supporting member 3. The sintered lamellas 4 are flush with and closes the wall of the shaping nest 1b.

A holding ring 5 is inserted in an opening 2c of the holding member 2 and holds a pipe 6 concentrically to and at a distance from the inner wall of the suction chamber 3a. The holding ring 5 is provided with openings 5a through which the liquid can flow along the outer wall of the pipe 6. The interior of the pipe 6 is connected with the exterior thereof by throughgoing openings 6a. Thereby, the liquid flowing through the interior of the pipe 6 into the suction chamber 3a can be withdrawn outwardly along the pipe. In this way, gas particles entering the suction chamber 3a through the ventilation openings 3c can be entrained by the liquid.

The holding member 2 has a recess 2d in which a further pipe 7 is arranged concentrically to the pipe 6. The inner diameter of the pipe 7 is greater than the outer diameter of the pipe 6 so that the liquid flowing from the suction chamber 3a can pass through the space between the pipes 6 and 7. The free ends of the pipes 6 and 7 are inserted in a connecting piece 8 which connects the pipe 6 with a supply opening 8a and the pipe 7 with a withdraw opening 8b.

The supply opening 8a is connected in known manner with a riser pipe 9 which extends into an open supply container 10 for flushing liquid. The withdraw opening 8b is connected via a conduit 11 with the suction side of a pump 12 which returns the flushing liquid withdrawn from the supply container 10 back to the latter via a connecting conduit 13. Thereby the flushing liquid which is supplied through the riser pipe 9 into the suction chamber 3a and the gas passing through the ventilating openings 3c are always aspirated during this process. The gas particles which are entrained by the flushing medium and conveyed to the supply container can pass off to the free upper surface of the liquid in the supply container 10.

Figure 2:
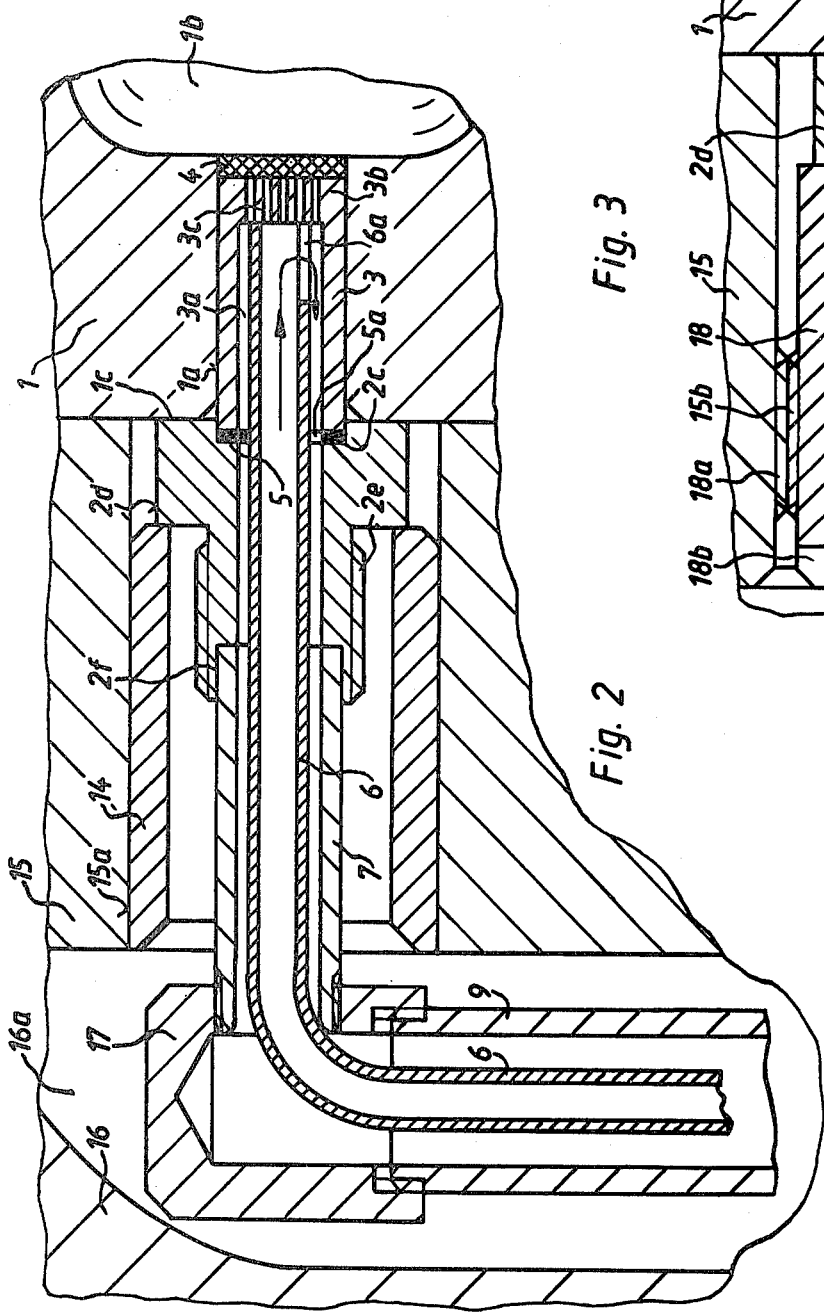
FIG. 2 is a view corresponding to that of FIG. 1 but showing the ventilating arrangement in accordance with another embodiment of the present invention.

In the ventilating arrangement shown in FIG. 2, the member 2 is not provided with an outer thread 2a, but instead has a smooth collar 2d. A pressing sleeve 14 abuts against the collar 2d. The pressing sleeve 14 is easily displaceable in an opening 15a of a further tool part 15 and in mounted condition supports on a tool part 16. The pressing sleeve 14 actually forms a setting cylinder which fixes the holding member 2 inserted in the wall 1 in its working position.

In order to facilitate the dismounting, the holding member 2 is provided at its periphery with a thread 2e so that when the pressing sleeve 14 is removed, a pulling tool can be screwed onto the holder 2.

Figure 3:
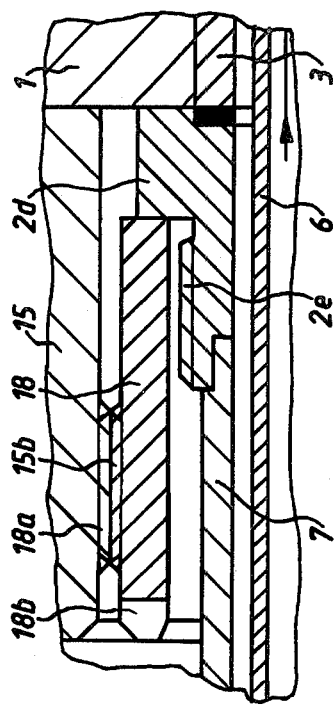
FIG. 3 is a view showing a section of a pressing sleeve provided with a thread in accordance with the invention.

In the ventilating arrangement shown in FIG. 3, a pressing sleeve 18 is provided which also abuts against the collar 2d of the member 2. However, the pressing sleeve 18 is provided with an outer thread 18a which meshes with the inner thread of the tool part 15. Thereby the pressing sleeve is retained in its working position. The pressing sleeve 18 has an end portion provided with a plurality of recesses 18b suited for inserting a screwing tool.

It will be understood that each of the elements described above, or two or more together, may also find a useful application in other types of constructions differing from the types described above.

While the invention has been illustrated and described as embodied in a ventilating arrangement for a shaping tool, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A ventilating device for a shaping tool having a wall and a mold cavity the device comprising a gas-permeable member communicating with the cavity of the shaping tool; a supporting member connected with and arranged to support said gas-permeable member and having a plurality of ventilating openings communicating with the cavity of the shaping tool through said gas-permeable member; means for holding and fixing said supporting member within the wall of the shaping tool, said holding and fixing means being connected and easily withdrawable together with said supporting member so as to remove said supporting member together with said gas-permeable from the wall of the shaping tool, thereby providing easy access to the gas-permeable member so that the latter is replaceable without removing the shaping tool; and means forming a suction chamber which communicates with said ventilating openings of said supporting member 13 suitable for passing flushing liquid to said gas-permeable member.

2. A device as defined in claim 1, wherein, said gas permeable member being arranged in the wall of the shaping tool.

3. A device as defined in claim 1, wherein said gas-permeable member is soldered to the supporting member.

4. A device as defined in claim 1, wherein said supporting member has a longitudinal wall portion which is cylindrical and inwardly bounds said chamber, and a transverse wall portion which is provided with said ventilating openings communicating with said gas permeable member.

5. A device as defined in claim 4, wherein, said longitudinal wall portion of said supporting member extends into the wall of the shaping tool.

6. A device as defined in claim 1, wherein said wall is provided with a thread, said holding and fixing means having a part provided with a counterthread for screwing of said holding and fixing means in said thread of the wall so as to hold and fix said supporting member in the wall of the shaping tool.

7. A device as defined in claim 6, wherein said holding and fixing means has a hexagonal part at its end remote from said supporting member in longitudinal direction for providing disassembling thereof by a wrench.

8. A device as defined in claim 1; and further comprising means for supplying and withdrawing the flushing liquid, said chamber communicating with said supplying and withdrawing means.

9. A device as defined in claim 8, wherein said supplying and withdrawing means includes a supply container and a suction pump, said chamber communicating with said supply container, on the one hand, and with said suction pump, on the other hand.

10. An arrangement as defined in claim 9, wherein said supply container is provided with a riser pipe, whereas said suction pump is provided with a suction pipe, said chamber being connected with said pipes.

11. A device as defined in claim 10, wherein said holding and fixing means has openings for providing a supply and withdrawing passage to said chamber for the flushing liquid.

12. A device as defined in claim 11; wherein said supply and withdrawing passage is constituted by a supplying conduit and a withdrawing conduit each communicating with said suction chamber, said conduits being mounted to said supporting member concentrically relative to one another.

13. The arrangement as defined in claim 12, wherein the supplying conduit communicates with said rise pipe via a supply opening and the withdrawing conduit is communicating with the suction pipe via a withdrawal opening.

14. A device as defined in claim 1, wherein said wall bounds said cavity, said holding and fixing means being connected to a pressing element so that upon abutment of the pressing element against the holding and fixing means the support member is fixedly positioned in the wall of the shaping tool.

15. An arrangement as defined in claim 14, wherein said sleeve-shaped pressing member is formed as a setting cylinder.

16. A device as defined in claim 14, wherein said holding and fixing means has a shoulder, said pressing element being arranged to abut against said shoulder of said holding and fixing means and thereby to press the latter against the wall of the shaping tool for fixedly positioning the supporting member.

17. A device as defined in claim 14, wherein said pressing element is sleeve-shaped.

18. An arrangement as defined in claim 17, wherein said sleeve-shaped pressing member is provided with means for holding the same in its working position.

19. An arrangement as defined in claim 18, wherein said holding means includes a thread provided on said sleeve-shaped pressing member so that the latter can be screwed into the wall of the shaping tool.

20. An arrangement as defined in claim 19, wherein said supporting member is provided with means for engaging a pulling tool.

21. An arrangement as defined in claim 20, wherein said engaging means includes a thread formed on said supporting member and arranged to mesh with the pulling tool.

* * * * *